United States Patent [19]
Dodin et al.

[11] 4,279,978

[45] Jul. 21, 1981

[54] BATTERY SEPARATOR EMPLOYING ZINC SELECTIVE ADDITIVE MATERIALS

[75] Inventors: Mark G. Dodin, Danbury; Allen Charkey, Brookfield, both of Conn.

[73] Assignee: Energy Research Corporation, Danbury, Conn.

[21] Appl. No.: 152,725

[22] Filed: May 23, 1980

[51] Int. Cl.³ .............................................. H01M 2/16
[52] U.S. Cl. ...................................... 429/248; 429/252
[58] Field of Search ............... 429/247, 248, 249, 250, 429/251, 252, 253, 254

[56] References Cited

U.S. PATENT DOCUMENTS

| | | |
|---|---|---|
| 3,347,707 | 10/1967 | Southworth, Jr. et al. ..... 429/249 X |
| 3,351,495 | 11/1967 | Larsen et al. ......................... 429/252 |
| 3,472,700 | 10/1969 | Kollman et al. ..................... 429/250 |
| 3,749,604 | 7/1973 | Langer et al. ................... 429/251 X |

*Primary Examiner*—Anthony Skapars
*Attorney, Agent, or Firm*—Watson, Leavenworth, Kelton & Taggart

[57] ABSTRACT

A separator for use in an alkaline battery having a zinc electrode wherein the separator comprises a polyamide constituent, a wettable polymeric constituent and a filler material reactive with zinc.

18 Claims, No Drawings

BATTERY SEPARATOR EMPLOYING ZINC SELECTIVE ADDITIVE MATERIALS

BACKGROUND OF THE INVENTION

This invention pertains to alkaline batteries, and, in particular, to separators for use in such batteries.

Separators developed specifically for alkaline batteries are known in the prior art. Such separators are used to electrically insulate the negative and positive battery electrodes so that the battery electrolyte forms the only ionically conducting path therebetween. In order for the separators to provide this insulating function, the separators must exhibit a low electrical resistance, must be chemically stable in the electrolyte environment, must resist stiffening and cracking, must be wettable to the battery electrolyte, and must limit active material transport.

U.S. Pat. No. 3,351,495 discloses a class of prior art separators having composition intended to realize such characteristics. In these separators plasticizers and filler materials are incorporated in a polyolefin (e.g., polyethelene, polypropylene) and portions thereof leached out prior to battery formation to provide a resultant separator having a microporous structure. Such microporous structure is said to prevent solid electrode active material from passing through the separator and to further inhibit passage of positive electrode ions to the negative electrode.

U.S. patent application Ser. No. 923,216 assigned to the same assignee hereof discloses a separator wherein a thermoplastic contituent (e.g., polysulfone, polypropylene, nylon) is provided with a filler material which is reactant with alkaline electrolyte of the battery and, therefore, is leachable in situ during battery construction. The resultant separator of this application is of microporous structure sufficient to prevent dendritic growth and provide desired electrode ion diffusion. This application also discloses the incorporation of plasticizers and wetting agents in the thermoplastic-reactive material composition to provide additional enhanced separator properties.

It is an object of the present invention to provide an improved separator for alkaline batteries employing electrodes of zinc active material.

It is a further object of the present invention to provide a separator of the last-mentioned type having improved resistance to zinc ion diffusion.

SUMMARY OF THE INVENTION

The above and other objects of the present invention are realized in a separator construction comprising a mixture of a polyamide constituent, a wettable polymeric constituent and a filler material reactive with zinc active material. Preferably, the polymeric constituent has a pore size significantly smaller, (i.e., about 1/10 or less) than that of the polyamide constituent. A preferable polymeric constituent is polyolefin oxide and a preferable zinc reactive material is cerium dioxide.

The invention also contemplates addition to the mixture of plasticizers, wetting agents, and fillers, the plasticizers and fillers preferably being controllably extractable from the resultant composite.

The above and other features and aspects of the present invention will become apparent upon reading the following detailed description.

DETAILED DESCRIPTION

As discussed hereinabove, one desired characteristic of battery separators is that they controllably inhibit the transport or diffusion of electrode active material therethrough. In alkaline batteries employing zinc electrodes, the problem of active material transport control is much more acute, due to the solubility of the zinc active material in the alkaline electrolyte, typically, potassium hydroxide. Excessive transport of active material results in dendritic growth which can lead to battery shorting, while insufficient transport causes "zinc electrode shape change" which is detrimental to battery operation.

The separator of the present invention achieves zinc transport control through utilization of a polyamide constituent, a wettable polymeric constituent of significantly smaller pore size than the polyamide constituent and a filler material which is reactive with the zinc active material. Preferably, the polyamide constituent has a pore size in a range of about 500 to 1000 Angstroms, while the polymeric constituent a pore size in a range of about 20 to 50 Angstroms.

The polyamide and polymeric constituents due to their different chemical structures and different pore sizes and, thus, permeability properties, result in a separator which possesses desired zinc transport properties. The microporous structure of the polyamide permits a limited degree of zinc diffusion which acts to inhibit zinc electrode shape change. The smaller pore structure of the polymeric constituent on the other hand, restrains zinc transport to aid in preventing zinc dendritic formation. The blend of the two constituents finds the polymeric constituent particles situated uniformly in the polyamide matrix and results in a separator which is mechanically and chemically stable in the battery cell environment and which exhibits dendrictic growth and shape change prevention.

Additional zinc transport control promotive of shape change reduction is realized with the zinc reactive filler material. A preferred filler material is cerium dioxide ($CeO_2$) and a preferred range of concentration of the zinc reactive filler is from about 3 to 40 percent by weight of the mixture of materials used to form the separator. In this regard, $CeO_2$ reacts with zinc (Zn) in the presence of an alkaline electrolyte (e.g., KOH) in accordance with the following reactions:

$$CeO_2 + 2Zn + 30\ H^- \rightarrow Ce(OH)_3 + 2Zno \quad (1)$$

or $$2CeO_2 + 3Zn + H_2O + O_2 \rightarrow Ce_2O_3 \cdot H_2O + 3ZnO \quad (2)$$

Other materials reactive with zinc active material (i.e., zinc, zinc ions, potassium zincate) may also be utilized in accordance with the invention. These additional materials comprise the following: CaO, $Ca(OH)_2$, MgO, $Mg(OH)_2$, BaO, $Ba(OH)_2$, $Al_2O_3$, $Al(OH)_3$, $Zn\ F_z$ and $Zn_3(BO_3)_2$.

Preferably, the wettable polymeric constituent is a polyolefin oxide whose content is from about 5 to 50 percent by weight of the separator mixture. A typical polyolefin oxide is polyethylene oxide sold under the trade name of Polyox (manufactured by Union Carbide). The polyamide may vary over a wide range in molecular weight as usually occurs in commercial grades of the polymer. Typical polyamides which may be used are Elvamides produced by Du Pont. Also, the content of the polyamide is preferably from about 30 percent by weight of the content of the separator mixture.

To add elasticity and wettability to the separator over and above that provided by the polymeric constituent of the separator mixture, the invention further contemplates the addition thereto of a wetting agent and a plasticizer. Preferably, the plasticizer is a controllably extractable non-polymeric constituent such as, for example, triethanolamine. Other useable plasticizers are ethylene glycol, glycerol, polyproxylene glycol and triethyl phosphate. The quantity of plasticizer if added to the separator mixture should be added in an amount from about 2 to 80 percent by weight of the combined polyamide and wettable polymeric constituent or 1 to 40 percent by weight of the total separator mixture. Preferably, the wetting agent is also a non-polymeric constituent such as, for example, Victawet. Other possible wetting agents are dioctyl sodium sulfosuccinate, sodium lariryl sulfate and sodium alkyl benzene sulfonate. The quantity of wetting agent, if added to the mixture, should be added in an amount from about 2 to 30 percent by weight of the total separator mixture.

The presence of the added wetting agent affords the resultant separator structure increased wettability and decreased electrical resistance. The added plasticizer, in turn, decreases the inside stresses resulting during the separator formation from solution and which otherwise might result in cracking of the separator during dry storage.

Also contemplated in the present invention is the inclusion in the separator mixture of a further filler which is controllably extractable therefrom. A preferred filler for this purpose is the alkaline reactive filler silicon dioxide. Other fillers which might also be used are oxides, hydroxides, and carbonates of calcium, magnesium, barium and iron. When an additional filler of this nature is employed in the separator mixture a quantity of from about 5 to 25 percent by weight of the separator mixture should preferably be used.

In formation of the present separator, a desired pore structure is realized by extracting portions of the non-polymeric plasticizer and/or filler. This can be accomplished as described in the above-referenced U.S. patent.

In separators of the invention having as a constituent silicon dioxide, the small particle size of this material results in clumping during mixing. Such clumping could result in the creation of pinholes in the finished separator. Clumping of the silicon dioxide is, however, found to be significantly reduced in the preferred separator construction wherein cerium dioxide is employed as the zinc reactive filler. In this construction, the cerium dioxide inhibits clumping of the fine silicon dioxide particles. Cerium dioxide is also found to reduce the electrical resistance of the resultant separator and prevents separation of the separator mixture during separator formation.

In formation of the separator, the separator constituents (polyamide, wettable polymeric constituent, zinc reactive filler, wetting agent, plasticizer, and additional alkaline reactive filler, if used) are blended or mixed together to form a composite mixture or solution suitable for application to a casting machine for formation of the mixture into a thin film or sheet. For this purpose, conventional casting machines for casting films can be used. Cast films can also be produced by a doctor blade on a metal or glass sheet. Solvents for preparing the blend into a suitable casting solution are also known. Typical solvents might be methanol, and mixtures of methanol and methylene dichloride. While casting is preferred for forming the separator of the invention, other conventional sheet forming methods could also be employed. Such methods include extruding, calendaring, injection molding, compression molding, spraying, etc.

After formation of the separator film, the film can be subjected to an extraction process for extracting added plasticizer and added filler to provide desired pore volume and porosity characteristics. The solvent chosen for this extraction should not dissolve the polyamide, the polymeric constituent or the zinc reactive filler to any great extent at the extraction temperatures employed. Extraction procedures as disclosed in the aforementioned patent may be used to provide the desired extraction of plasticizer and added filler.

After the extraction procedure has been completed, the separator film is dried at a suitable temperature in a range from 25° to 50° C. The dried separator film may then be cut to a size suitable for battery application.

The battery separator of the present invention exhibits an electrical resistance with the accepted range of about 10 to 80 milliohms per square inch. Typically, the present separators exhibit an electrical resistance of 25 to 75 millohms per square inch for a separator of thickness of 2-5 mils in 35 percent KOH.

The following examples illustrate separators formed in accordance with the principles of the present invention.

EXAMPLE I

In this example, separator construction was carried out using a polyamide polymer sold under the name Elvamide 8064 (manufactured by E. I. DuPont). The poleolefin oxide was a polyethylene oxide sold under the trade name Polyox WSR 301 with a molecular weight of 4,000,000. Cerium dioxide was used as the zinc reactive filler and Victawet as an added wetting agent.

A blend was prepared containing the following constituents:
 60% by weight Elvamide 8064
 20% by weight Polyox WSR-301
 12% by weight Victawet
 8% by weight cerium dioxide Methanol was employed as the solvent for the Elvamide and Polyox, each being dissolved in methanol separately. The required quantity of cerium dioxide and Victawet were blended with methanol and subjected to ultrasonic blending. All parts were then mixed together and the resultant mixture or solution cast on a metal sheet using a doctor blade. The cast film or sheet was then oven dried at 60° C. and a resultant sheet of 2 mils thickness obtained. The sheet was then removed from the plate and its electrical resistance was measured as 45 milliholms per square inch in 35% KOH.

EXAMPLE II

The procedure of Example I was employed with the additional utilization of $SiO_2$ as a further filler. A blend was prepared containing the following components:
 65% by weight Elvamide 8062
 11% by weight $SiO_2$
 7.5% by weight $CeO_2$ 11% by weight liquid Victawet
5.5% by weight Polyox WSR-301

The resultant film had a more uniform surface than the prior film and exhibited an electrical resistance of 50 milliholms per square inch.

In all cases, it is understood that the above-described separator formulations are merely illustrative of the many possible specific embodiments which represent applications of the present invention. Numerous and varied other formulations can readily be devised in accordance with the principles of the present invention without departing from the spirit and scope of the invention.

What is claimed is:

1. A battery separator for use with battery having an alkaline electrolyte and an electrode comprised of zinc active material, said separator including a polyamide constituent, a wettable polymeric constituent and a filler material reactive with zinc.

2. A separator in accordance with claim 1 wherein: said polymeric constituent has a pore size which is about one tenth or less than the pore size of said polyamide constituent.

3. A separator in accordance with claim 2 wherein: said polymeric constituent has a pore size in a range of about 20 to 50 Angstroms; and said polyamide constituent has a pore size in a range of about 500 to 1000 Angstroms.

4. A separator in accordance with claim 1 wherein: said polymeric constituent is a polyolefin oxide.

5. A separator in accordance with claim 1 wherein: said polymeric constituent is from about 5 to 50% by weight of said separator.

6. A separator in accordance with claim 1, wherein: said zinc reactive material is cerium dioxide.

7. A separator in accordance with claim 1 wherein: said zinc reactive material is selected from the group consisting of: $CeO_2$, $CaO$, $Ca(OH)_2$, $MgO$, $Mg(OH)_2$, $BaO$, $Ba(OH)_2$, $Al_2O_3$, $ZnF$, and $Zn_3(BO_3)_2$.

8. A separator in accordance with claim 1, wherein: said zinc reactive material is from about 3 to 40% by weight of said separator mixture.

9. A separator in accordance with claim 1, wherein: said separator comprises a wetting agent.

10. A separator in accordance with claim 9, wherein: said wetting agent is a non-polymeric constituent.

11. A separator in accordance with claim 9, wherein: said wetting agent is from about 2 to 30% by weight of said separator mixture.

12. A separator in accordance with claim 1 or 10, wherein: said separator comprises a plasticizer.

13. A separator in accordance with claim 11, wherein: said plasticizer is non-polymeric.

14. A separator in accordance with claim 12, wherein: said plasticizer is from about 1 to 50% by weight of said separator mixture.

15. A separator in accordance with claim 1, wherein: said separator comprises a further filler material.

16. A separator in accordance with claim 15, wherein: said further filler is reactive in alkaline electrolyte.

17. A separator in accordance with claim 16, wherein: said further filler is $SiO_2$.

18. A separator in accordance with claim 14, wherein: said further filler is from about 5 to 25% by weight of said separator mixture.

* * * * *